United States Patent
Gabl

(10) Patent No.: US 10,046,978 B2
(45) Date of Patent: Aug. 14, 2018

(54) METHOD FOR PROCESSING PACKING MATERIAL TO RECOVER ALUMINIUM

(71) Applicant: ANDRITZ AG, Graz (AT)

(72) Inventor: Helmuth Gabl, Graz (AT)

(73) Assignee: Andritz AG, Graz (AT)

( * ) Notice: Subject to any disclaimer, the term of this patent is extended or adjusted under 35 U.S.C. 154(b) by 0 days.

(21) Appl. No.: 15/310,961

(22) PCT Filed: May 21, 2015

(86) PCT No.: PCT/EP2015/061232
§ 371 (c)(1),
(2) Date: Nov. 14, 2016

(87) PCT Pub. No.: WO2015/181038
PCT Pub. Date: Dec. 3, 2015

(65) Prior Publication Data
US 2017/0073244 A1    Mar. 16, 2017

(30) Foreign Application Priority Data

May 28, 2014   (AT) .................. A 422/2014

(51) Int. Cl.
| | |
|---|---|
| *C01F 7/00* | (2006.01) |
| *C01F 7/42* | (2006.01) |
| *B09B 3/00* | (2006.01) |
| *C22B 3/04* | (2006.01) |
| *C22B 7/00* | (2006.01) |
| *C22B 21/00* | (2006.01) |
| *B09B 5/00* | (2006.01) |
| *B29B 17/02* | (2006.01) |
| *C01F 7/02* | (2006.01) |
| *D21C 5/02* | (2006.01) |
| *B29L 31/00* | (2006.01) |

(52) U.S. Cl.
CPC .............. *C01F 7/428* (2013.01); *B09B 3/00* (2013.01); *B09B 3/0083* (2013.01); *B09B 5/00* (2013.01); *B29B 17/02* (2013.01); *C01F 7/021* (2013.01); *C01F 7/022* (2013.01); *C01F 7/023* (2013.01); *C22B 3/04* (2013.01); *C22B 7/00* (2013.01); *C22B 7/005* (2013.01); *C22B 7/007* (2013.01); *C22B 21/00* (2013.01); *D21C 5/02* (2013.01); *B29B 2017/0217* (2013.01); *B29B 2017/0268* (2013.01); *B29B 2017/0293* (2013.01); *B29L 2031/7164* (2013.01); *B29L 2031/7166* (2013.01); *Y02P 10/234* (2015.11)

(58) Field of Classification Search
CPC ....... B09B 3/0016; B09B 3/00; C01B 7/0718; C01B 7/0706; C01F 7/441; C01F 7/02–7/027; C01F 7/428; C22B 7/007; B29B 17/02; D21C 5/02
USPC ................................ 423/132, 625, 488, 113
See application file for complete search history.

(56) References Cited

U.S. PATENT DOCUMENTS

| | | | | |
|---|---|---|---|---|
| 5,421,526 A | * | 6/1995 | Johansson | B03B 9/061 241/20 |
| 5,571,703 A | * | 11/1996 | Chieffalo | B09B 3/00 426/11 |
| 5,980,850 A | * | 11/1999 | Lebl | C23G 1/36 423/394.2 |
| 6,030,433 A | * | 2/2000 | Luggenhorst | C01B 9/02 423/107 |
| 6,193,780 B1 | * | 2/2001 | Cases Rocati | B29B 17/02 156/712 |
| 2004/0129372 A1 | * | 7/2004 | Huang | B29B 17/02 156/94 |

FOREIGN PATENT DOCUMENTS

| | | | |
|---|---|---|---|
| EP | 0775760 | * | 5/1997 |
| EP | 1772554 | * | 4/2007 |
| GB | 518260 | * | 2/1940 |
| JP | 2005-230721 | * | 9/2005 |
| WO | 2010/054449 | * | 5/2010 |
| WO | 2015/029067 | * | 3/2015 |
| WO | 2015/053645 | * | 4/2015 |

OTHER PUBLICATIONS

Translation of JP 2005-230721, Sep. 2, 2005.*
Abstract of FR-2510428A1, Feb. 4, 1983.*
Abstract of CN 101745518A, Jun. 23, 2010.*
Abstract of EP 0543302 A1, May 26, 1993.*

* cited by examiner

*Primary Examiner* — Steven J Bos
(74) *Attorney, Agent, or Firm* — Alix, Yale & Ristas, LLP

(57) ABSTRACT

The subject of the present invention is a method for processing metallized packaging materials, especially beverage cartons, or blister packaging.
According to the invention, the aluminum is dissolved with the aid of acid and separated from the plastic. The metal-containing acid solution then undergoes pyrohydrolytic treatment and the acid is thus recovered. The aluminum can be recovered as valuable aluminum oxide.

21 Claims, 1 Drawing Sheet

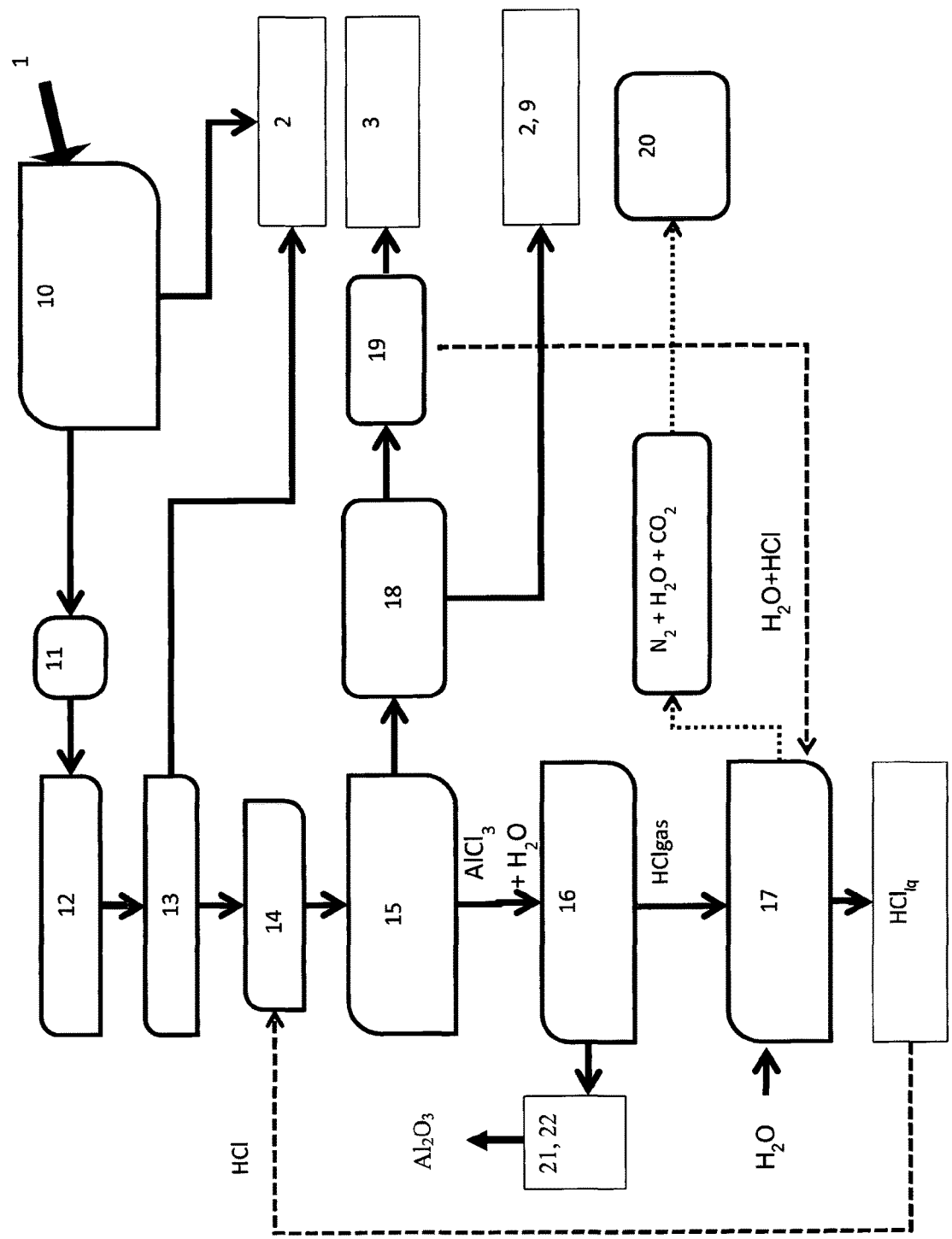

METHOD FOR PROCESSING PACKING MATERIAL TO RECOVER ALUMINIUM

BACKGROUND

The subject of the present invention is a method for processing metallized packaging materials, especially beverage cartons like Tetra Pak, ELOPAK, etc., or transparent (blister) packaging.

Despite their name, beverage cartons are not made of cardboard alone, but contain several closely compounded layers of cardboard and plastic—as well as aluminum for longer life products such as juice and milk. Aluminum protects the product against oxygen and light. In 2006, beverage cartons contained only 60-76 percent pulp, 13-34 percent plastic, and 0-6 percent aluminum. The plastic layer is usually polyethylene.

Tetra Pak is a brand of beverage cartons sold since the 1950s by the Swedish company of the same name and common throughout the world, particularly as packaging for milk. The brand name has become an everyday German term synonymous with beverage cartons.

At the moment, it is mainly the pulp content, i.e. the fibers, that is recycled from the beverage cartons collected for recycling. The fibers are re-used in the production of paper, cardboard, and paperboard. The plastic content, which has increased substantially in the meantime, is usually used to generate energy, i.e. it is incinerated, and the aluminum content is also incinerated as a substitute for bauxite in the cement industry. In many cases, the plastic and aluminum fractions are only pressed into bales and then go to landfill. This residue is thus only used as a substitute for primary fuel or goes to landfill.

With the aid of special molding processes, the shredded beverage cartons are used to make simple objects (fruit crates, etc.) without specific quality requirements. For this purpose, the plastics present are melted as composite material, while the residual fibers, aluminum, and residual materials are included in the molding process.

There are also recycling concepts where the plastic fraction is oiled and the aluminum is recovered in the form of flakes.

In a different process, the rejects, i.e. the plastic films and aluminum foils, undergo pyrolysis in a gas reactor at temperatures of over 400° C. In this process, the polyethylene begins to gasify (pyrolysis gas) upwards of 400° C., while the aluminum remains in solid form at this temperature. However, the aluminum produced is an agglomerate that is contaminated with non-gasified impurities (mainly carbon compounds, but also other metals). The combustible pyrolysis gas then provides electrical and thermal energy when it is incinerated. A method in which the plastic fraction is gasified in a fluidized bed is described, for example in WO 00/09771 A1 or in WO 00/09770 A1.

WO 97/49494 A1 describes a method where the metallized packaging material is shredded with the aid of a refiner and the fibers are recovered by means of a drum pulper.

In another recycling process, the rejects are treated with a plasma jet at a temperature of more then 1100° C. The aluminum in the rejects does leave the process in re-usable form as bars, but this process is very energy-intensive.

Recovery of the individual components in beverage cartons as real valuable materials, i.e. without incineration of the plastic fraction, has been contemplated in various ways and tested in pilot plants, but has never been applied yet anywhere on an industrial scale.

For example, WO 2010/052016 A2 describes a method where the shredded plastic waste is separated using heavy media separation. Here, selective solvent treatment is also applied, which causes the individual plastic components to dissolve, thus separating them from the metal or other plastic components. With this method, different plastic layers can be recovered individually. Both the fibrous material and the aluminium layer result as separate fractions.

DE 31 10 254 A1 describes a recycling process for blister packaging, whose uses include packaging of pharmaceuticals in tablet or capsule form. In this case, the aluminum-PVC reject foils/films are granulated, mixed with additives, and used as basic material for thermoplastics. Separate recovery of plastic and aluminum is not possible with this method.

SUMMARY

The invention is also based on the task of providing an elegant process with which to recover the basic fractions (plastic and aluminum) from packaging materials.

This object is accomplished by means of a method according to claim 1.

In the method according to the invention, the aluminum is dissolved with the aid of acid, with the result that largely only the plastic fraction remains as a solid. The metal-containing acid solution then undergoes pyrohydrolytic treatment, preferably in a spray roasting reactor. Here, the acid is recovered by spray roasting of the solution containing metal, followed by absorption and/or condensation of the gases thus formed in an aqueous absorption solution. The recovered acid can then be used again to dissolve the aluminum.

The metal oxides forming during pyrohydrolysis, i.e. the aluminum oxide, is removed at the base of the spray roaster or also during gas scrubbing (cyclone separator). The set-up of a plant of this kind for acid recovery is described, for example, in AT395312B and EP0775760A1.

The quality of the aluminum oxide can be influenced by setting the process parameters accordingly during pyrohydrolytic treatment, favoring the formation of cubic $\gamma$-$Al_2O_3$, as well as crystallinity or the formation of rhombohedral (trigonal) $\alpha$-$Al_2O_3$, for example. It is also possible to influence the grain size distribution.

In packaging materials that also contain fibrous materials, it is useful to detach the fibrous material first of all and then to remove or separate the fibrous suspension thus formed from the remaining plastic and aluminum residues. After this, the aluminum is dissolved with the aid of acid.

The acid used is preferably hydrochloric acid (HCl) because the aluminum dissolves in it particularly well and without the plastic, for example polyethylene, being attacked.

The quality of the aluminum oxide formed can be further enhanced if it undergoes thermal post-treatment after the pyrolytic treatment. As a result of this post-treatment, the carbon residues are incinerated, while the $\alpha$-$Al_2O_3$ fraction and crystallinity are increased. Thermal post-treatment takes place at temperatures between 800° C. and 2400° C., preferably at 900 to 2000° C., especially at 1400° C. to 1900° C.

The aluminum oxide can be post-treated in a lime kiln, for example, or in a plasma reactor.

In one embodiment of the invention, the aluminum oxide is ground after pyrohydrolytic treatment or after thermal post-treatment. The grinding process can take place in a solids grinder, for example, or in a liquid medium with the aid of ultrasound.

In order to increase the quality of the aluminum oxide and reduce costs, it is an advantage if the material is classified according to particle size.

It is advantageous if fibers still adhering to the plastics or the aluminum are separated in highly dynamic machines, such as a friction machine or a friction dryer, before adding the acid. This guarantees that the fiber fraction is very small, for example less than 1%, before adding the acid.

After separating the metal-containing solution, it is useful to feed the plastics to an additional cleaning stage, where the remaining fibers and acid residues are removed from the plastics. The wash water used for washing can be fed to the absorption column for acid recovery.

The plastic and aluminum mix is preferably shredded before acid treatment so that the contact surface for the acid is larger and the aluminum can be dissolved more quickly as a result. It is favorable to conduct acid treatment at temperatures between 50° C. and 80° C.

In order to obtain a high-grade aluminum solution, it is useful to detect other metals, such as iron or also nonferrous metals (copper, etc.), beforehand and remove them from the product stream, for example using magnets, eddy current technology, or with NIR, XRF, induction combined with blow-out systems, heavy media separation, and so on.

BRIEF DESCRIPTION OF THE DRAWINGS

FIG. 1 shows a schematic representation of a preferred embodiment of the disclosed method.

DETAILED DESCRIPTION

In the following, FIG. 1 describes the invention on the basis of an embodiment example for recovery of the valuable materials from beverage cartons.

The beverage cartons 1, shredded if necessary, are fed to a 25 pulp recovery stage 10 together with water, where pulps are detached to form a pulp suspension before the aluminum is dissolved and where the pulp suspension is separated from the plastics and aluminum before the aluminum is dissolved in the acid. Here, the pulp recovery stage 10 can contain a drum pulper (FFD), a highconsistency pulper (HC), a medium-consistency pulper (MC) or a low-consistency pulper (LC). Plants of this kind in the pulp recovery stage 10 from beverage cartons 1 are 30 already known and thus are not described here in more detail. The recovered fibers 2 can then be re-used to make paper or board after any pulp cleaning that may be needed from case to case to remove aluminum flakes.

The plastic and aluminum foil fractions, which are largely free of fibers, are shredded in a shredder 11 to a size of 50×50 mm for example, or else to 15×15 mm or to 80×80 mm. After this, iron particles are removed from the product flow by a metal separator 12, for example a suspended magnet, and nonferrous metals are removed in a subsequent device.

In another process stage 13, the fibers 2 still adhering to the plastic and the aluminum are separated with the aid of friction machines or friction dryers. This fiber fraction can account for up to 25% of the total reject fraction. The recovered fibers 2 can then be post-treated in an additional process stage and combined with the fibers recovered in the pulp recovery stage 10.

In the dissolving stage 14, the aluminum layer dissolves due to the addition of highly concentrated (>18%) hydrochloric acid (HCl), preferably at a high temperature and with continuous mixing. An $AlCl_3$ solution forms, which is then separated from the still solid plastic fraction, e.g. the polyethylene, in the subsequent filtration stage 15.

The metal solution can be purified afterwards using wet chemical or physical methods, thus increasing the purity of the aluminum oxide. It is also feasible to add raw materials in a targeted way, preferably metals such as chromium, platinum, titanium, etc., to the $AlCl_3$ solution in order to influence the structure of the oxide formed after roasting.

The metal solution, which is almost free of solids, is fed directly to the spray roasting reactor 16. Optionally, the metal-containing solution is cleaned using wet chemical or physical methods before pyrohydrolitic treatment in the roasting reactor 16.

In order to recover the hydrochloric acid, the aqueous $AlCl_3$ solution is sprayed into the heated, spray roasting reactor 16 in fine droplets with the aid of nozzles. The liquid evaporates first of all as a result of the heat generated (evaporation phase), and then the metal compounds start to decompose (oxidation phase). The droplets descend in free fall to the bottom part of the reactor and are roasted within a few seconds, i.e. they are separated pyrolytically into a metal oxide and an acid fraction. The acid fractions are removed at the reactor head and the aluminum oxide ($Al_2O_3$) through an opening in the reactor floor. Part of the aluminum oxide can also accumulate in the dust separator for purifying the gaseous acid fractions. The gaseous acid fraction ($HCl_{gas}$) is subsequently absorbed and condensed in an absorption column 17.

The recovered hydrochloric acid ($HCl_{liq}$) can then be fed to the dissolving stage 14 again.

The aluminum accumulating in the spray roasting reactor 16 subsequently undergoes thermal post-treatment 21 here at a temperature of 1400° C. to 1900° C., for example, and is then ground in order to increase the surface area.

The solids fractions are discharged as a mixture of residual fibers and plastic with residual acid adhering to it in the filtration stage 15 and fed to an additional cleaning stage 18 (e.g. a friction stage with mechanical dryer), where fibers 2 and residual materials 9 are separated from the plastic 3.

After post-washing 19 and possibly drying, the plastics 3 are available in clean and pH-neutral form as material ready for sale or as material ready for granulation in an integrated granulating stage. The acid-containing wash water can be used for absorption of the gaseous acid components in 17.

The exhaust gases from the acid recovery process 16, 17 are cleaned in a gas scrubber 20, e.g. applying catalytic post-treatment.

A process diagram for the recycling of blister packaging can be set up in the same way, omitting the units for fiber separation and fiber cleaning.

The invention claimed is:

1. A method for processing packaging materials containing plastics, aluminum and other metals, comprising:
    separating metals other than aluminum from the packaging material, leaving a mix containing plastics and aluminum;
    subjecting the mix to acid that dissolves the aluminum, thereby forming a solution of aluminum in the acid, with a plastic fraction;
    separating the plastic from the solution of aluminum in acid;
    pyrohydrolytically treating the solution of aluminum in acid to form an aluminum oxide fraction and a gaseous acid fraction; and
    recovering the acid in the gaseous acid fraction by absorption or condensation.

2. The method according to claim 1, wherein the packaging material includes pulp and the pulp is detached from the packaging material to form a pulp suspension and the pulp suspension is separated from the plastics and aluminum before the aluminum is dissolved in acid.

3. The method according to claim 1, wherein the acid used to dissolve the aluminum is hydrochloric acid.

4. The method according to claim 1, wherein the pyrohydrolytic treatment is conducted in a spray roasting reactor.

5. The method according to claim 1, wherein the aluminum oxide formed undergoes thermal post-treatment.

6. The method according to claim 5, wherein the thermal post-treatment takes place at a temperature between 800° C. and 2400° C.

7. The method according to claim 5, wherein the thermal post-treatment is conducted in a lime kiln or a plasma reactor.

8. The method according to claim 1, wherein the aluminum oxide is ground.

9. The method according to claim 1, wherein the aluminum oxide is subjected to fractionation according to particle size.

10. The method according to claim 1, wherein the acid recovered in the pyrohydrolytic treatment is used again to dissolve the aluminum.

11. The method according to claim 2, wherein after the metals other than aluminum are separated, pulp fibers still adhering to the plastics or aluminum are dynamically separated before the aluminum is dissolved in the acid.

12. The method according to claim 2, wherein the plastics are fed to an additional cleaning stage after separating the solution of aluminum in acid and any remaining pulp fibers and acid residues are removed from the plastics in this additional cleaning stage.

13. The method according to claim 12, wherein the plastics are washed with water to form a wash water containing acid, and the wash water containing acid is used for absorption of the gaseous products formed.

14. The method according to claim 1, wherein the plastics and the aluminum are shredded in the acid before the aluminum is dissolved.

15. The method according to claim 1, wherein the solution of aluminum in acid is cleaned using wet chemical or physical methods before pyrohydrolitic treatment.

16. The method according to claim 1, wherein additives are added to the solution of aluminum in acid before the pyrohydrolitic treatment.

17. A method for processing packaging materials containing plastics, metals including aluminum, and pulp, comprising:
separating the pulp from the packaging material;
separating metals other than aluminum from the packaging material;
after separating the pulp and the other metals to leave a mix of plastics and aluminum components, subjecting the mix to acid thereby dissolving the aluminum and forming a solution of aluminium in the acid with a plastic fraction;
separating the solution of aluminium in the acid from the plastic fraction;
pyrohydrolytically treating the solution of aluminium in the acid in order to form an aluminum oxide fraction and a gaseous acid fraction; and
recovering the acid in the gaseous acid fraction by absorption or condensation.

18. The method according to claim 17, wherein the separated pulp forms a pulp suspension and the pulp suspension is separated from the plastics and aluminum before the aluminum is dissolved in acid.

19. The method according to claim 18, wherein the plastics and the aluminum are shredded in the acid before the aluminum is dissolved.

20. The method according to claim 19, wherein the plastics are fed to an additional cleaning stage after separating the solution of aluminum in acid and any remaining fibers and acid residues are removed from the plastics in this additional cleaning stage.

21. The method according to claim 17, wherein the acid used to dissolve the aluminum is hydrochloric acid.

* * * * *

UNITED STATES PATENT AND TRADEMARK OFFICE
CERTIFICATE OF CORRECTION

PATENT NO. : 10,046,978 B2
APPLICATION NO. : 15/310961
DATED : August 14, 2018
INVENTOR(S) : Helmuth Gabl Page 1 of 1

It is certified that error appears in the above-identified patent and that said Letters Patent is hereby corrected as shown below:

On the Title Page

Item (54):
Replace "PACKING" with --PACKAGING--

Signed and Sealed this
Ninth Day of October, 2018

Andrei Iancu
*Director of the United States Patent and Trademark Office*